3,455,934
SPIRO[1,3-DIOXOCYCLOALKANE-QUINOLINE] COMPOUNDS

Bernard Loev, Broomall, Pa., assignor to Smith Kline & French Laboratories, Philadelphia, Pa., a corporation of Pennsylvania
No Drawing. Continuation-in-part of application Ser. No. 545,267, Apr. 26, 1966. This application Oct. 16, 1967, Ser. No. 675,303
Int. Cl. C07d *99/04, 33/12*
U.S. Cl. 260—289                8 Claims

ABSTRACT OF THE DISCLOSURE

Spiro[1,3-dioxane and -dioxolane-2,2'(1'H)-quinoline] and spiro[1H-cyclopropa[c]quinoline - 2(3H), 2'-[1,3]-dioxane and -dioxolane] compounds are prepared by converting a carbostyril to the 2-lower alkoxy or 2-chloro quinolinium salt, treating the quinolinium salt with sodium alkoxide to give the di-lower alkylacetal of the carbostyril, and reacting the acetal with a diol. These compounds have central nervous system depressant, muscle relaxant and analgesic activity.

---

This application is a continuation-in-part of Ser. No. 545,267, filed Apr. 26, 1966 now abandoned.

This invention relates to new spiro[1,3-dioxane and -dioxolane-2,2'(1'H)-quinoline] and spiro[1H-cyclopropa[c]-quinoline-2(3H), 2'-[1,3]-dioxane and -dioxolane] compounds having pharmacodynamic activity, in particular, having central nervous system depressant and muscle relaxant activity, as demonstrated by administration to rates at doses of 25 to 300 mg./kg. orally in the dose range test, and analgesic activity, as shown in the D'Amour-Smith test in rats at 50 mg./kg. orally. This invention also relates to intermediates for preparing pharmacodynamically active compounds of this invention.

The new spiro compounds of this invention having the above described pharmacodynamic activity are represented by the following formula:

Formula I

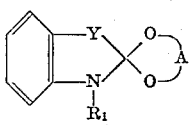

when:

A is an alkylene chain having 2–3 carbon atoms substituted by 0–4 straight chain lower alkyl groups and 0–1

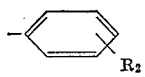

groups;
Y is —CH=CH—, —CH$_2$—CH$_2$— or

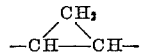

$R_1$ is hydrogen, lower alkyl or lower alkoxy and
$R_2$ is hydrogen, halogen or trifluoromethyl.

The pharmacodynamically active compounds of this invention have the basic structure of Formula I. However, it is apparent to one skilled in the art that obvious nuclear substituents may be incorporated on the benzenoid ring of the quinoline nucleus. Such substituents, which are known to the art, are halogen, trifluoromethyl, lower alkyl, lower alkoxy, hydroxy, nitro, amino, mono-lower alkylamino, di-lower alkylamino, lower alkanoylamino, lower alkoxycarbonyl, carboxy, carbamoyl, sulfamoyl or methylenedioxy. These substituted compounds are used as are the parent compounds.

Advantageous compounds of this invention are represented by the following formula:

Formula II

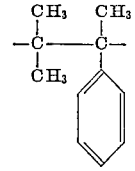

when:

A is —CH$_2$—CH$_2$—, —CH$_2$—CH$_2$—CH$_2$—,

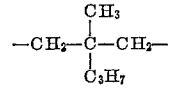

or

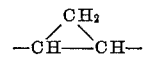

Y is —CH=CH—, —CH$_2$—CH$_2$— or

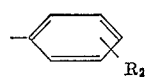

and
$R_1$ is lower alkyl, preferably methyl.

The advantageous compounds of Formula II have, optionally, a chloro or trifluoromethyl substituent on the benzenoid ring of the quinoline nucleus in the position para to the attachment of the nitrogen atom.

In addition, this invention relates to new benzyl compounds which are represented by the following formula:

Formula III

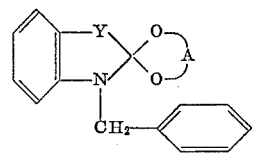

when:

A is an alkylene chain having 2–3 carbon atoms substituted by 0–4 straight chain lower alkyl groups and 0–1

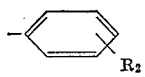

groups;

Y is —CH=CH—, —CH$_2$—CH$_2$— or

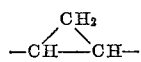

and

R$_2$ is hydrogen, halogen or trifluoromethyl.

The benzyl compounds of Formula III are useful as intermediates in the preparation of N-unsubstituted compounds of Formula I as is described herebelow.

Benzyl compounds having the basic structure of Formula III may have substituents, such as halogen, trifluoromethyl, lower alkyl, lower alkoxy, hydroxy, nitro, amino, mono-lower alkylamino, di-lower alkylamino, lower alkanoylamino, lower alkoxycarbonyl, benxyloxycarbonyl, carbamoyl, sulfamoyl or methylenedioxy, incorporated on the benzenoid ring of the quinoline nucleus. These compounds are used, as described herebelow, to prepare pharmacodynamically active compounds which have the basic structure of Formula I in which R$_1$ is hydrogen and which are substituted on the benzenoid ring of the quinoline nucleus.

The terms "lower alkyl," "lower alkoxy" and "lower alkanoyl" where used herein denote groups having 1–4 carbon atoms, preferably 1–2 carbon atoms, and "halogen" denotes chloro, bromo or fluoro.

Spiro compounds of this invention are prepared by the following procedure:

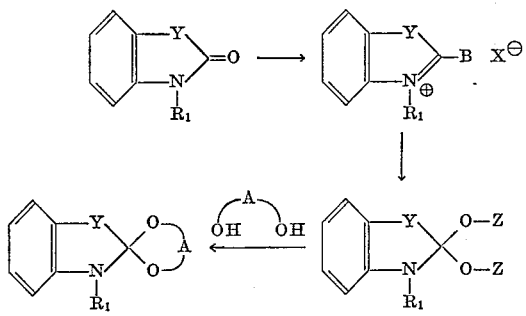

The terms A, Y and R$_2$ are as defined above;

R$_1$ is lower alkyl, lower alkoxy or benzyl;
Z is lower alkyl;
B is lower alkoxy or chloro and
X is an anion such as methosulfate or fluoborate.

According to the above procedure, a carbostyril is converted to the quinolinium salt having a 2-lower alkoxy, preferably methoxy or ethoxy, or 2-chloro substituent.

To prepare the 2-lower alkoxyquinolinium salt, the carbostyril is reacted with an alkylating agent such as a lower alkylsulfate or a tri-lower alkyloxonium fluoborate. The lower alkylsulfate salts are prepared by reacting equimolar amounts of the carbostyril and the lower alkylsulfate at elevated temperatures for example at about 70–100° C. for about 1–3 hours. The fluoborate salts are prepared by reacting equimolar amounts of the carbostyril and the tri-lower alkyloxonium fluoborate at about room temperature in an inert solvent such as methylene chloride.

The 2-chloroquinolinium salts are prepared by reacting an N-unsubstituted carbostyril with a chlorinating agent such as phosphorus pentachloride, phosphorus oxychloride, tosyl chloride in pyridine or carbonyl chloride, then forming the N-lower alkylquinolinium salt with an alkylating agent such as a lower alkylsulfate or a tri-lower alkyloxonium fluoborate as described above for the preparation of the 2-lower alkoxyquinolinium salts.

The quinolinium salts are treated with a sodium lower alkoxide to give the di-lower alkylacetal of the carbostyril. The reaction is carried out in a solvent such as a lower alkanol at about room temperature for about 15–60 minutes. The solvent is removed in vacuo and the residue is distilled. Alternatively, the residue, without distillation, may be used in the reaction with a diol as described herebelow.

The acetal of the carbostyril is reacted with a diol of the formula

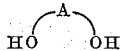

in which A is as defined above. This reaction is carried out by heating approximately equimolar amounts of the reactants at about 80–175° C. until the lower alkanol distills off. Alternatively, the reaction is carried out in an inert solvent such as ether or chloroform at about room temperature for about 1–6 hours.

The compounds of Formula I in which R$_1$ is hydrogen are prepared by hydrogenation of the benzyl intermediates of Formula III. The hydrogenation is carried out at room temperature in the presence of a catalyst such as, for example platinium in ethyl acetate.

Substituents, such as halogen, trifluoromethyl, lower alkyl, lower alkoxy, hydroxy, nitro, di-lower alkylamino, lower alkanoylamino, lower alkoxycarbonyl, benzyloxycarbonyl, carbamoyl, sulfamoyl or methylenedioxy, may be present on the benzenoid ring of the carbostyril starting material to prepare substituted spiro compounds.

Compounds having the basic structures of Formulas I and III and having an amino or mono-lower alkylamino substituent on the benzenoid ring of the quinoline are prepared as follows. The amino substituted compounds are prepared by reducing the corresponding nitro substituted compounds by catalytic hydrogenation at room temperature or chemically, for example, with stannous chloride in hydrochloric acid. The mono-lower alkylamino substituted compounds are prepared by mono-alkylating the amino substituted compound by known procedures, such as, by reacting with about an equimolar amount of an alkylating agent such as a lower alkyl halide or by acylation and reduction.

Compounds having the basic structure of Formula I and having a carboxy substituent on the benzenoid ring of the quinoline are prepared by catalytic hydrogenation of the corresponding benzyloxycarbonyl substituted compounds at room temperature using, for example, palladium-on-carbon in ethyl acetate.

Compounds having the basic structure of Formula I in which R$_1$ is hydrogen and having a nitro substituent on the benzenoid ring of the quinoline are prepared by oxidizing the corresponding amino substituted compounds using peroxytrifluoroacetic acid.

The carbostyril starting materials are either known to the art or are prepared by known methods as for example as described in U.S. 3,141,888.

The compounds of Formula I may be administered internally in conventional dosage forms by incorporating an appropriate dose of the compound with pharmaceutical carriers according to accepted pharmaceutical practices.

The following examples are not limiting but are illustrative of compounds of this invention and procedures for their preparation.

EXAMPLE 1

Triethyloxonium fluorborate (55 g.) is added to 46 g. of N-methylcarbostyril in 60 ml. of methylene chloride at room temperature. The solid material is isolated by filtration to give 2-ethoxy-1-methylquinolinium fluoborate. To a solution of 23 g. of sodium ethoxide in 250 ml. of ethanol is added 62 g. of 2-ethoxy-1-methylquinolinium fluoborate portionwise over one hour. After one hour, the mixture is filtered, concentrated and filtered in vacuo. Hexane is added to the solid material and the solution is filtered, concentrated and distilled to give the diethyl acetal of 1-methylcarbostyril.

Dry ethylene glycol (1.55 g.) is added to 5.8 g. of the above prepared acetal. The mixture is heated in an oil bath at 90–150° C. until ethanol ceases distilling out, then concentrated and distilled to give 1′-methylspiro[1,3-dioxolane-2,2′-(1′H)-quinoline].

EXAMPLE 2

A mixture of 15.9 g. of N-methylcarbostyril and 12.6 g. of methylsulfate is heated in an oil bath at 80° C. for two hours, then cooled and washed with ether to give 2-methoxy-1-methylquinolinium methosulfate.

2-methoxy-1-methylquinolinium methosulfate (5.7 g.) is added to 1.3 g. of sodium ethoxide in ethanol. The mixture is concentrated in vacuo. An ether solution of 4.3 g. of 2-(p-chlorophenyl)-3-methyl-2,3-butanediol is added and the resulting mixture is stirred for five hours, then concentrated in vacuo to give, as the residue, 4-(p-chlorophenyl) - 1',4,5,5 - tetramethylspiro[1,3 - dioxolane - 2,2'-(1'H)-quinoline].

EXAMPLE 3

To 1.9 g. of sodium methoxide in ethanol is added 9.5 g. of 2-methoxy-1-methylquinolinium methosulfate. The mixture is stirred for 30 minutes, then concentrated in vacuo. An ethereal solution of 4.4 g. of 2-methyl-2-propyl-1,3-propanediol is added and the mixture is stirred for two hours, then filtered and concentrated in vacuo. The solid residue is recrystallized from hexane to give 1',5 - dimethyl - 5 - propylspiro[1,3 - dioxane-2,2'(1'H)-quinoline].

EXAMPLE 4

By the procedure of Example 1, 1-methyl-6-trifluoromethylcarbostyril is reacted with triethyloxonium fluoborate to give 2-ethoxy-1-methyl-6-trifluoromethylquinolinium fluoborate.

The above prepared quinolinium salt is added to sodium ethoxide in ethanol and the mixture is then concentrated in vacuo. To the residue is added an ether solution of 1,3-propanediol. The resulting mixture is stirred for five hours at room temperature, then concentrated and distilled to give 1'-methyl-6'-trifluoromethylspiro[1,3-dioxane-2,2'(1'H)-quinoline].

Similarly, using 3,4-dihydro-1-methyl-6-trifluoromethylcarbostyril in the above procedure the product is 3',4'-dihydro - 1'- methyl-6'-trifluoromethylspiro[1,3-dioxane-2,2'(1'H)-quinoline].

EXAMPLE 5

By the procedure of Example 1, the following compounds are converted to the quinolinium fluoborate salts:
1a,7b-dihydro-3-methyl-6-trifluoromethyl-1H-cyclopropa[c]quinolin-2-one
1a,7b-dihydro-3-methyl-5,6-methylenedioxy-1H-cyclopropa[c]quinolin-2-one
6-bromo-1a,7b-dihydro-3-methyl-1H-cyclopropa[c]-quinolin-2-one
1a,7b-dihydro-3-methoxy-1H-cyclopropa[c]-quinolin-2-one and
3-benzyl-6-chloro-1a,7b-dihydro-1H-cyclopropa[c]-quinolin-2-one.

Each of these salts is reacted with sodium ethoxide in ethanol, the mixture is concentrated and then reacted with ethylene glycol as in Example 1 to give the following products, respectively:

1a,7b-dihydro-3-methyl-6-trifluoromethylspiro[1H-cyclopropa[c]quinoline-2(3H),2'[1,3]-dioxolane]
1a,7b-dihydro-5,6-methylenedioxy-3-methylspiro[1H-cyclopropa[c]quinoline-2(3H),2'-[1,3]-dioxolane]
6-bromo-1a,7b-dihydro-3-methylspiro[1H-cyclopropa[c]-quinoline-2(3H),2'-[1,3]-dioxolane]
1a,7b-dihydro-3-methoxyspiro[1H-cyclopropa[c]quinoline-2(3H),2'-[1,3]-dioxolane] and
3-benzyl-6-chloro-1a,7b-dihydrospiro[1H-cyclopropa[c]quinoline-2(3H),2'-[1,3]-dioxolane].

Hydrogenating the above prepared 3-benzyl compound at room temperature in ethyl acetate using platinum as catalyst gives, after filtering, concentrating and distilling, 6 - chloro - 1a,7b - dihydrospiro[1H-cyclopropa[c]quinoline-2-(3H),2'-[1,3]-dioxolane].

EXAMPLE 6

By the procedure of Example 2, the diethyl acetal of N-methylcarbostyril is reacted with the following diols:

2-methyl-3-(p-trifluoromethylphenyl)-2,3-butanediol
2,2-diethyl-1,3-propanediol
2-phenyl-1,2-propanediol to give the following products, respectively:

1',4,4,5-tetramethyl-5-(p-trifluoromethylphenyl)-spiro-[1,3-dioxolane-2,2'(1'H)-quinoline]
5,5-diethyl-1'-methylspiro[1,3-dioxane-2,2'(1'H)-quinoline] and
1',4-dimethyl-4-phenylspiro[1,3-dioxolane-2,2'(1'H)-quinoline].

EXAMPLE 7

A mixture of 16.1 g. of 3,4-dihydro-1-methyl-carbostyril (prepared by hydrogenating 1-methylcarbostyril in ethanol in the presence of Raney nickel) and 12.6 g. of methylsulfate is heated at 80° C. for two hours, then washed with ether to give 3,4-dihydro-2-methoxy-1-methylquinolinium methosulfate. By the procedure of Example 3, this quinolinium salt is converted to the dimethyl acetal derivative.

By the procedure of Example 2, the di-methyl acetal of 3,4-dihydro-1-methylcarbostyril is reacted with the following diols:

2-phenyl-1,3-propanediol
1,2-propanediol
2-methyl-3-propyl-2,3-hexanediol
2-(p-fluorophenyl)-3-methyl-2,3-butanediol to give the following products, respectively:

3',4'-dihydro-1'-methyl-5-phenylspiro[1,3-dioxane-2,2'(1'H)-quinoline]
3',4'-dihydro-1',4-dimethylspiro[1,3-dioxolane-2,2'-(1'H)-quinoline]
3',4'-dihydro-1',4,4-trimethyl-5,5-dipropylspiro-[1,3-dioxolane-2,2'(1'H)-quinoline] and
4-(p-fluorophenyl)-3',4'-dihydro-1',4,5,5-tetramethylspiro[1,3-dioxolane-2,2'(1'H)-quinoline].

EXAMPLE 8

By the procedure of Example 7, the following carbostyrils are converted to the quinolinium methosulfate salts:

1,7-dimethylcarbostyril
6-methoxy-1-methylcarbostyril
1-methyl-6-nitrocarbostyril
1-methyl-6-dimethylaminocarbostyril
6-acetamido-1-methylcarbostyril
6-methoxycarbonyl-1-methylcarbostyril
6-carbamoyl-1-methylcarbostyril
1-methyl-6-sulfamoylcarbostyril
5,7-dichloro-1-methylcarbostyril
6,7-dimethoxy-1-methylcarbostyril.

Each of these quinolinium methosulfate salts is added to sodium methoxide in ethanol and the resulting mixture is concentrated in vacuo and treated with an ether solution of 2-(p-chlorophenyl)-3-methyl-2,3-butanediol by the procedure of Example 2 to give the following products, respectively:

4-(p-chlorophenyl)-1',7',4,5,5-pentamethylspiro[1,3-dioxolane-2,2'(1'H)-quinoline]
4-(p-chlorophenyl)-6'-methoxy-1',4,5,5-tetramethylspiro-[1,3-dioxolane-2,2'(1'H)-quinoline]
4-(p-chlorophenyl)-1',4,5,5-tetramethyl-6'-nitrospiro-[1,3-dioxolane-2,2'(1'H)-quinoline]
4-(p-chlorophenyl)-1',4,5,5-tetramethyl-6'-dimethylaminospiro[1,3-dioxolane-2,2'(1'H)-quinoline]
6'-acetamido-4-(p-chlorophenyl)-1',4,5,5-tetramethylspiro[1,3-dioxolane-2,2'(1'H)-quinoline]

4-(p-chlorophenyl)-6'-methoxycarbonyl-1',4,5,5-tetramethylspiro[1,3-dioxolane-2,2'(1'H)-quinoline]
6'-carbamoyl-4-(p-chlorophenyl)-1',4,5,5-tetramethylspiro[1,3-dioxolane-2,2'(1'H)-quinoline]
4-(p-chlorophenyl)-1',4,5,5-tetramethyl-6'-sulfamoylspiro[1,3-dioxolane-2,2'(1'H)-quinoline]
5',7'-dichloro-4-(p-chlorophenyl)-1',4,5,5-tetramethylspiro[1,3-dioxolane-2,2'(1'H)-quinoline] and
4-(p-chlorophenyl)-6',7'-dimethoxy-1',4,5,5-tetramethylspiro[1,3-dioxolane-2,2'(1'H)-quinoline].

Refluxing the above prepared 4-(p-chlorophenyl)-6'-methoxy - 1',4,5,5 - tetramethylspiro[1,3-dioxolane-2,2'(1'H)-quinoline] with hydrobromic acid in acetic acid for four hours, then concentrating in vacuo and recrystallizing the residue gives 4-(p-chlorophenyl)-6'-hydroxy-1',4,5,5 - tetramethylspiro[1,3 - dioxolane - 2,2'(1'H)-quinoline].

Similarly, 4-(p-chlorophenyl)-6'-7'-dihydroxy-1',4,5,5-tetramethylspiro[1,3 - dioxolane-2,2'(1'H)-quinoline] is prepared from the corresponding 6'-7'-dimethoxy compound.

EXAMPLE 9

Refluxing an ethanol solution of 6-methoxycarbonyl-1-methylcarbostyril with an excess of 10% sodium hydroxide solution, then cooling the mixture, acidifying and filtering gives 6-carboxy-1-methylcarbostyril.

Ten grams of 6-carboxy-1-methylcarbostyril, 2.7 g. of sodium methoxide and 8.4 g. of benzyl bromide in ethanol are heated at reflux for four hours. The mixture is then filtered and the filtrate is evaporated to dryness to give 6-benzyloxycarbonyl-1-methylcarbostyril.

By the procedure of Example 1, 6-benzyloxycarbonyl-1-methylcarbostyril is converted to the diethyl acetal which is reacted with ethylene glycol to give 6'-benzyloxycarbonyl - 1' - methylspiro[1,3 - dioxolane - 2,2'(1'H)-quinoline]. Catalytic hydrogenation using palladium-on-carbon in ethyl acetate gives, after filtering and removing the solvent in vacuo, 6'-carboxy-1'-methylspiro[1,3-dioxolane-2,2'(1'H)-quinoline].

EXAMPLE 10

4-(p-chlorophenyl) - 1',4,5,5 - tetramethyl - 6' - nitrospiro[1,3-dioxolane-2,2'(1'H)-quinoline] is hydrogenated in ethyl acetate containing Raney nickel at room temperature until one equivalent of hydrogen is taken up to give, after filtering and removing the solvent in vacuo, 6'-amino-4-(p-chlorophenyl) - 1'4,5,5 - tetramethylspiro [1,3-dioxolane-2,2'(1'H)-quinoline].

Treating the above prepared 6'-amino compound with an equimolar amount of ethyl bromide in ethanol at 50° C. for two hours, then concentrating in vacuum and distilling the residual oil in vacuo gives 4-(p-chlorophenyl)-6'-ethylamino - 1',4,5,5 - tetramethylspiro[1,3-dioxolane-2,2'(1'H)-quinoline].

EXAMPLE 11

A mixture of 16 g. of 2-chloroquinoline and 13 g. of benzyl chloride in chloroform is heated at reflux for one hour, then concentrated in vacuo. The residue is treated with ether and filtered to give 1-benzyl-2-chloroquinolinium chloride.

To 2.7 g. of sodium methoxide in anhydrous methanol is added 14.4 g. of 1-benzyl-2-chloroquinolinium chloride. The mixture is concentrated in vacuo and treated with an ether solution of ethylene glycol by the procedure of Example 4 to give 1'-benzylspiro[1,3-dioxolane-2,2'(1'H)-quinoline].

Hydrogenating the above prepared 1'-benzyl compound at room temperature in dioxane with palladium catalyst, then filtering, concentrating and distilling gives spiro[1,3-dioxolane-2,2'(1'H)-quinoline].

Similarly, using 2-(p-chlorophenyl)-3-methyl-2,3-butanediol in place of ethylene glycol in the above procedure, 1'-benzyl-4-(p-chlorophenyl) - 4,5,5 - trimethylspiro[1,3-dioxolane-2,2'(1'H)-quinoline] is obtained which on hydrogenation by the procedure described above gives 4-(p-chlorophenyl) - 4,5,5 - trimethylspiro[1,3 - dioxolane-2,2'(1'H)-quinoline].

By the same procedure, using 2-methyl-2-propyl-1,3-propanediol in place of ethylene glycol, 1'-benzyl-5-methyl-5-propylspiro[1,3-dioxane-2,2'(1'H)-quinoline] is obtained which on hydrogenation gives 5-methyl-5-propylspiro[1,3-dioxane-2,2'(1'H)-quinoline].

What is claimed is:
1. A compound of the formula:

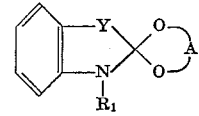

in which:

A is an alkylene chain having 2–3 carbon atoms substituted by 0–4 straight chain lower alkyl groups and 0–1

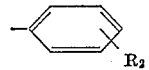

groups;

Y is —CH=CH—, —CH₂—CH₂— or

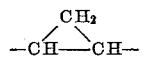

$R_1$ is hydrogen, lower alkyl or lower alkoxy and
$R_2$ is hydrogen, halogen or trifluoromethyl.

2. A compound according to claim 1 in which A is ethylene, Y is —CH=CH— and $R_1$ is methyl.
3. A compound according to claim 1 in which A is 2-methyl-3-(p-chlorophenyl)-2,3-butylene, Y is

—CH=CH— and $R_1$ is methyl.
4. A compound according to claim 1 in which A is 2-methyl-2-propyl-1,3-propylene, Y is —CH=CH— and $R_1$ is methyl.
5. A compound of the formula:

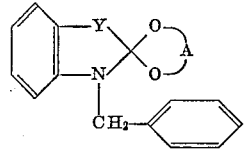

in which:

A is an alkylene chain having 2–3 carbon atoms substituted by 0–4 straight chain lower alkyl groups and 0–1

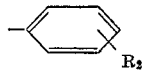

groups;

Y is —CH=CH—, —CH₂—CH₂— or

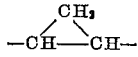

and $R_2$ is hydrogen, halogen or trifluoromethyl.
6. A compound according to claim 5 in which A is ethylene and Y is —CH=CH—.

7. A compound according to claim 5 in which A is 2-methyl-3-(p-chlorophenyl)-2,3-butylene and Y is

—CH=CH—

8. A compound according to claim 5 in which A is 2-methyl-2-propyl-1,3-propylene and Y is —CH=CH—.

References Cited

FOREIGN PATENTS 1,002,668  8/1965  Great Britain.

OTHER REFERENCES

Cavallito et al.: Jour. Am. Chem. Soc., vol. 66, pp. 1166–71 (1944).

ALEX MAZEL, Primary Examiner

D. G. DAUS, Assistant Examiner

U.S. Cl. X.R.

260—286, 287, 288, 632, 690, 694, 999